Figure 1:
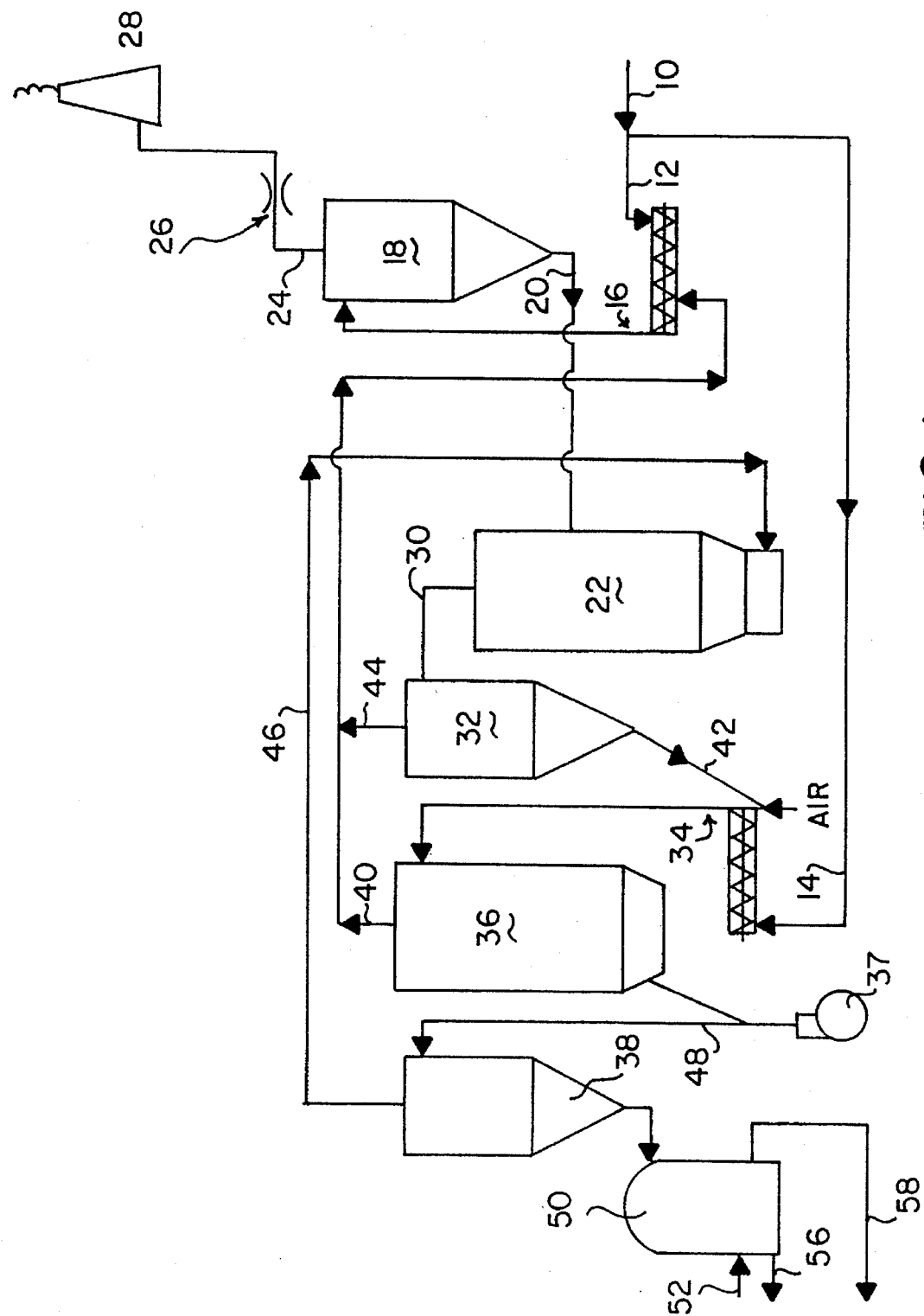

United States Patent

Mills et al.

[11] Patent Number: 5,596,816
[45] Date of Patent: Jan. 28, 1997

[54] METHOD FOR DRYING PARTICULATE MATERIAL

[75] Inventors: Gregory J. Mills, Jandakot; William S. Maley, Mount Pleasant, both of Australia

[73] Assignee: Alcoa of Australia Ltd., Melbourne, Australia

[21] Appl. No.: 540,034

[22] Filed: Oct. 6, 1995

[30] Foreign Application Priority Data

Oct. 6, 1994 [AU] Australia .................. PM8686

[51] Int. Cl.⁶ .................. F26B 3/00
[52] U.S. Cl. .................. 34/346; 34/377; 34/179
[58] Field of Search .................. 34/86, 136, 179, 34/346, 347, 377, 376, 378, 379; 432/5, 13, 67, 121, 239

[56] References Cited

U.S. PATENT DOCUMENTS

| | | | |
|---|---|---|---|
| 4,376,343 | 3/1983 | White et al. | 34/109 |
| 4,581,829 | 4/1986 | Becker et al. | 34/15 |
| 4,761,893 | 8/1988 | Glorioso | 34/11 |
| 4,953,478 | 9/1990 | Glorioso | 110/215 |
| 5,069,801 | 12/1991 | Girovich | 210/770 |
| 5,215,670 | 6/1993 | Girovich | 210/770 |
| 5,428,906 | 7/1995 | Lynam et al. | 34/379 |

*Primary Examiner*—Henry A. Bennett
*Assistant Examiner*—Dinnatia Doster
*Attorney, Agent, or Firm*—Birch, Stewart, Kolasch & Birch, LLP

[57] ABSTRACT

A method is disclosed for drying particulate material, particularly alumina, which comprises the steps of subjecting a first portion of a wet particulate material feed to pre-drying to produce at least partially dried particular material and moisture, heating the at least partially dried particulate material to a temperature higher than the temperature of the pre-drying to produce hot particulate material, water vapour and products of combustion, passing the water vapour and products of combustion to the pre-drier, mixing the hot particulate material with a second portion of the wet particulate material feed to cool the hot particulate material and further cooling the cooled particulate material and subsequent separation to produce a low temperature particular material product.

22 Claims, 1 Drawing Sheet

METHOD FOR DRYING PARTICULATE MATERIAL

The present invention relates to a method for drying particulate material, and in particular for drying a particulate material which is nit significantly affected by temperatures in the order of 850° C. Preferably the particulate material is a material such as calcined alumina.

While it will become evident below that the method has been particularly developed for the drying of calcined alumina that has been subjected to a carbon dioxide leach, the process is not to be limited thereto. Indeed, the particulate material may be any type of material that is capable of being dried in a method such as that of the present invention. For example, materials which are normally dried in a pneumatic conveying dryer, which are generally those which, when dried, are granular and are reasonably free flowing, may be subjected to the method of this invention. However, the invention will be further described having particular regard only to the drying of alumina.

Throughout the aluminium industry, many aluminium smelters require alumina refineries to produce alumina with a low soda content, typically as low or lower than about 0.3% (expressed as NaO). Traditional soda levels in smelting grade alumina (SGA) presently produced by alumina refineries are in the order of 0.3 to 0.5% $Na_2O$. Therefore, refineries which are presently producing smelting grade alumina at or towards the upper end of that range will be forced to develop techniques for reducing the soda content of their product.

Proposals for achieving reductions in soda levels include increasing the temperature at which the precipitation of alumina trihydrate is practised in the Bayer process. However, this technique suffers from a number of disadvantages, such as increased energy costs, increased requirements for cooling in the alumina trihydrate precipitation circuit, and the production of weaker alumina trihydrate which is more prone to break down upon calcination or handling. An alternative to increasing the precipitation temperature has been to adopt mineral acid leaching of smelting grade alumina (using for example, hydrochloric acid, sulphuric acid or nitric acid) to remove some of the sodium from the alumina. However, this too suffers a number of disadvantages.

A process for the production of low soda content smelling grade alumina has thus been developed and has been described in our co-pending Australian patent application PM8685, titled "Process for the production of low soda-content Smelting Grade Alumina" filed on Oct. 6, 1994. In the process of application PM8685 there is required an initial calcine of aluminatrihydrate followed by the leaching of the calcined alumina trihydrate in a water slurry with carbon dioxide. The leached alumina slurry is then subjected to a final drying at a temperature between 300° C. and 1100° C.

An aim of the present invention is to provide a method for drying alumina, the method being capable of providing the final drying state in the process of application PM8685. However, a more general aim of the present invention is simply to provide a method for drying particulate material.

Thus, the present invention provides a method for drying particulate material, the method comprising the steps of:

a) subjecting a first portion of a water particulate material feed to pre-drying to produce at least partially dried particulate material and moisture;

b) heating the at least partially dried particulate material, utilising excess combustion air, to a temperature higher than the temperature of the pre-drying to produce hot particulate material, water vapour and products of combustion;

c) passing the water vapour and products of combustion from step (b) to the pre-drier of step (a);

d) mixing the hot particulate material with a second portion of the wet particulate material feed to cool the hot particulate material; and e) further cooling of the cooled particulate material and subsequent separation to produce a low temperature particulate material product.

The method preferably includes separating stages between steps (a) and (b) and steps (b) and (c) in order to separate, respectively, the moisture from the at least partially dry particulate material, and the water vapour and products of combustion from the hot particulate material. The separators and preferably cyclone separators.

When separated, the moisture and products of combustion from the pre-drying are preferably passed to a gas cleaning device, such as a wet scrubber, and the gases may subsequently be vented to atmosphere via a stack.

Indeed, by adopting the method of the invention the energy losses thereof are minimised due primarily to the exit temperatures of all streams being maintained as low as possible, but also due to the possible operation of the method with minimum levels of excess combustion air. Thus, by venting to atmosphere the moisture driven off during the pre-drying of the wet particulate material, the stack temperature remains low. Further, by splitting the wet particulate material into first and second portions, and by only subjecting the first portion to the pre-drying, a reasonable proportion of the moisture in that first portion of the wet particulate material is able to be driven off while not needing to subject the wet particulate material in the pre-drying to very high temperatures. This ensures that the temperature of the pre-drying is able to remain at low levels (such as in the order of 90° C. to 150° C.) and thus the temperature at the stack also is able to remain low (for example, in the order of the dew point).

Turning now to the preferred application of the present invention, namely the drying of alumina, and in particular calcined alumina that has been subjected to a carbon dioxide leach, it is preferred that the wet alumina is, at some stage during the method of the invention, subjected to a temperature at least in the order of 250° C. for an extended period of time. By ensuring that all wet alumina is maintained at or above this temperature, research has indicated that the final alumina product will have acceptable LOI (loss on ignition) and MOI (moisture on ignition) levels.

Accordingly, the second portion of the wet alumina feed is preferably also subjected to heating. This is preferably achieved by subjecting the partially dry alumina from the pre-drier to higher temperatures in a furnace, and by then mixing the subsequent hot alumina with the second portion of the wet alumina feed. In this respect, the furnace preferably operates at a temperature in the range of 800° C. to 1100° C., although a temperature of about 900° C. is preferred. The water vapour and products of combustion generated during the furnace operation are preferably separated from the hot alumina and passed through to the pre-drier in order to utilise the energy thereof in providing the heating for the pre-drying. This again is an indication of the ability of the method of the invention to ensure minimal losses of energy.

With regard to the furnace, it must be appreciated that when the method of the invention is used to dry alumina it is preferred that the heating occurs within the furnace in the presence of close to stoichoimetric quantities of air and gas. However, if this was to occur on its own, temperatures of about 2500° C. would be reached in the furnace, such high temperatures being undesirable for heating alumina due to it then undergoing undesirable phase changes.

To prevent such high temperatures, the furnace temperature is controlled in the 800° C. to 1100° C. range by the addition of the partially dried alumina from the pre-drier. This allows the method of the invention to successively dry the alumina without detrimentally affecting the surface area of the particles.

The hot gases and alumina at (preferably) 900° C. may then be separated, the hot gases passing to the pre-drier and the hot alumina being cooled by the second portion of the wet alumina feed. The mixing of these two streams causes cooling of the hot alumina and drying of the wet cake, and the two streams combine to provide a single alumina stream.

The mixing serves to drive off moisture from the second portion of the wet alumina feed by subjecting that second portion to the higher temperatures of the hot alumina of the first portion of the feed. With this in mind, the volume of wet alumina feed that is mixed with the hot alumina is preferably such that the temperature of the mixture decreases to a level wherein the final cooling may be readily attended to with the simple addition of combustion air, combustion air referring to stoichiometric plus excess combustion air.

The preferred mixing of the hot alumina with the second portion of the wet feed also serves to liberate steam as the moisture is driven out of the wet feed, and this liberation of moisture is envisaged to be rapid and violent. This ensures good mixing of the wet feed with the hot alumina and prevents the creation of dead areas within the mixing vessel, or alternatively within any ducting if a mixing vessel per se is not utilised.

In a preferred form of the invention, after the mixing of the hot alumina with the second portion of the wet alumina feed, the cooled alumina, together with the moisture generated during that mixing, are transported to a fluidised holding vessel. Preferably, the moisture and the transport air are separated in the vessel prior to holding the alumina at the preferred pre-determined level for a preferred pre-determined time. Preferably, the alumina is held in the fluidised bed of the holding vessel at about 300° C. for 10 to 30 minutes, depending upon the LOI required. In this respect, for some materials it may be necessary for them to be held for a time at a particular temperature to achieve product requirements. For example, for alumina, this will allow some of the chemically combined water to be removed to assist in achieving the final required moisture content.

The cooled alumina may then be transported to a cooling and separation stage wherein the cooled alumina is mixed with fresh cooling air (in the form of the combustion air referred to earlier) in order to lower the temperature of the alumina to the exit temperature, from which it may be necessary to provide additional cooling to temperatures suitable for a final product. Such additional cooling (if necessary) may be conducted in an indirectly cooled fluidised bed. The fresh cooling air thus undergoes an increase in temperature and this increased temperature air may then be used as the air providing for the furnace.

Therefore, the present invention provides a method for drying alumina, the method comprising the steps of:

(a) subjecting a first portion of a wet alumina feed to pre-drying to produce at least partially dried alumina and moisture;

(b) heating the at least partially dried alumina in a furnace, utilising excess combustion air, to a temperature higher than the temperature of the pre-drying to produce hot alumina, water vapour and products of combustion;

(c) passing the water vapour and products of combustion from step (b) to the pre-drying of step (a);

(d) mixing the hot alumina with a second portion of the wet alumina feed to cool the hot alumina; and (e) further cooling of the cooled alumina, and subsequent separation to produce a low temperature alumina product.

The present invention further provides a method for drying alumina, the method comprising the steps of:

a) subjecting a first portion of the wet alumina feed to pre-drying at a temperature between 90° C. and 150° C. to produce at least partially dried alumina and moisture;

b) separating the at least partially dried alumina from the moisture and products of combustion exiting the pre-drying step, venting the moisture and products of combustion to atmosphere and transporting the at least partially dried alumina at a temperature between 90° C. and 150° C. to a furnace;

c) heating the at least partially dried alumina to a temperature between 800° C. and 1100° C. in the furnace in the presence of about 10% excess combustion air to produce hot alumina, water vapour and products of combustion;

d) separating the hot alumina from the water vapour and products of combustion;

e) passing the water vapour and products of combustion from step (d) to the pre-drying of step (a);

f) mixing the hot alumina with a second portion of the wet alumina feed to cool the hot alumina to a temperature between 200° C. and 700° C.;

g) holding the cooled alumina in a holding vessel at a temperature between 200° C. and 700° C. for between 10 and 30 minutes;

h) further cooling of the cooled alumina with air, and subsequent separation to produce a low temperature alumina product and heated air, the heated air being recycled to the furnace to provide combustion air for step (c); and i) final cooling of the low temperature alumina product to a temperature suitable for downstream materials handling.

The present invention will now be described in relation to the accompanying schematic flow diagram of FIG. 1. However, it must be appreciated that the following description is not to limit the generally of the above description. Indeed, it must again be understood that following description only relates to the preferred operation of the method of the invention where the particulate material is alumina.

Illustrated in the flow diagram at FIG. 1 is a single supply stream 10 of wet alumina feed split into a first portion 12 and a second portion 14 preferably in a ratio of about 2:1. The wet alumina feed may be the washed alumina slurry produced by step (c) of the process in our co-pending patent application PM8685.

The first portion 12 of the wet alumina feed 10 is delivered to the pre-drier 16 where it undergoes heating to drive off all or part of the moisture contained therein. The pre-drier 16 is preferably a pneumatic conveying drier. The alumina is then separated in a first separation stage 18 from the moisture and the products of combustion, and is transported via stream 20 to the furnace 22. The moisture and products of combustion 24 separated from the alumina by the first separation stage 18 are preferably passed through a wet scrubber 26 following which the remaining gases are vented to atmosphere via stack 28.

The alumina undergoes further heating in the furnace 22 after which the hot alumina product and the water vapour and products of combustion therefrom are transported via stream 30 to a second separation stage 32. In this second separation stage 32 the hot gases are separated from the hot alumina, the hot gases being transferred via stream 44 to be passed to the pre-drier 16, whereas the hot alumina 42 is transported to the mixing stage 34, which is preferably in the form of a pneumatic conveying drier. In this respect, it will be appreciated that throughout this specification reference to the products of combustion within the pre-drier is not to imply that those products of combustion are generated in the pre-drier. The combustion products are generated in the furnace, after which their energy is utilised as they are passed through the pre-drier.

The mixing stage 34 allows the mixing of hot alumina from the furnace 22 with the second portion 14 of the wet alumina feed 10. Due to the substantially lower temperature and the higher moisture content of the second portion 14 of the wet alumina feed 10, the temperature of the hot alumina substantially decreases.

Following mixing, the cooled alumina and the further water vapour generated by the mixing are preferably transported to the fluidised holding vessel 36, together with additional fluidising air. In the holding vessel 36 the cooled alumina may be held for a pre-determined time at a predetermined temperature prior to being transported to the cooling stage 38. In relation to the holding vessel 36, the overflow gases from that vessel are directed via stream 40 to combine with the off gases from the furnace 22, as separated at the second separation stage 32, to be utilised in heating the first portion 12 of the wet alumina feed 10 in the pre-drier 16. Preferably, the separating stages (18 and 32) are both reverse flow gas cyclones, while the fluidised holding vessel 36 is preferably an integral cyclone and fluidised bed.

Cooling occurs in the cooling stage 38 where cooling air is added to the cooled alumina to produce a low temperature product. The cooling stage 38 may be comprised of one or more cooling cyclones as necessary. The subsequently heated cooling air may then be separated from the product, and passed via stream 46 to be used in the furnace 22 as the combustion air. However, the product may undergo final cooling in an indirectly cooled fluidised bed 50.

The temperature of the wet alumina feed in stream 10 will be in the range of 20° C. to 60° C. During the pre-drying of the first portion 12 of the wet alumina feed, the alumina will be heated to temperatures in the range of 90° C. to 150° C., thus driving off most of the entrained moisture in the wet alumina feed. Thus, the temperature of the alumina forwarded via stream 20 to the furnace 22 will preferably be in the range of 90° C. to 150° C. After separation and scrubbing, it is envisaged that the gases vented to atmosphere via stack 28 will most likely be at about the dew point and will generally be in the order of 70° to 90° C.

The furnace 22 is preferably operated at a temperature in the order of 900° C., although temperatures in the range of 800° C. to 1100° C. are envisaged. In theory, if all the material to be dried (namely, all of the wet alumina feed 10) was heated only by the products of near stoichiometric combustion, it is likely that the alumina would be subjected to gas temperatures in the order of 2500° C., thus potentially significantly reducing the surface area of the particles. However, the use of the method of the invention allows the at least partially dried alumina to itself act as a heat sink and quench the normal combustion reaction.

Thus, the hot alumina, water vapour and combustion products being transferred via stream 30 to the second separation stage 32 are also at about 900° C., as is the hot alumina being transferred to the mixing stage 34. Accordingly, the mixing stage 34 is received hot alumina at about 900° C. and also the second portion 14 of the wet alumina feed 10 which will be in the range of 20° to 60° C. In this respect, the water vapour liberated from stream 14 due to its mixing with the hot alumina, assists in transporting the alumina to the holding vessel 36.

After mixing, the temperature of the full recombined alumina flow is in the order of 300° C. and this is the preferred pre-determined temperature to be controlled in the holding vessel 36. Preferably, the alumina is held at that temperature within the holding vessel 36 for times in the range of 10 minutes to 30 minutes.

Following the holding of the alumina in vessel 36, the alumina is further cooled by incoming air from blower 37 in stream 48 as it is transported to the cooling stage 38. The product may then be subjected to final cooling in the indirectly cooled fluidised bed 50 with water entering at 52 and leaving at 56, the final alumina product 58 exiting the fluidised bed 50 with heated cooling water 56 being passed to a cooling tower before returning via stream 52.

It will thus be seen that the ability of the process of the invention to exchange heat as necessary from one stream to another allows for minimal losses of energy throughout the entire process. Indeed, the process allows for the removal of moisture from product having high moisture levels, with maximum energy efficiency. Minimum amounts of excess air are used, and the temperatures of the waste stream (stack) and the final product are also minimised.

It will also be appreciated that there may be other modifications and variations to the configurations described herein that are also within the scope of the present invention.

The claims defining the invention are as follows:

1. A method for drying particulate material, the method comprising the steps of:

a) subjecting a first portion of a wet particulate material feed to pre-drying to product at least partially dried particulate material and moisture;

(b) heating the at least partially dried particulate material, utilising excess combustion air, to a temperature higher than the temperature of the pre-drying to produce hot particulate material, water vapour and products of combustion;

c) passing the water vapour and products of combustion from step (b) to the pre-drier of step (a);

d) mixing the hot particulate material with a second portion of the wet particulate material feed to cool the hot particulate material; and e) further cooling of the cooled particulate material and subsequent separation to produce a low temperature particulate material product.

2. A method according to claim 1 including a separation stage between step (a) and (b) to separate the moisture and the products of combustion from the at least partially dry particulate material.

3. A method according to claim 1 wherein step (b) utilises a minimum of excess combustion air.

4. A method according to claim 1 including a separation stage between step (b) and step (c) to separate the water vapour and products of combustion from the hot particulate material.

5. A method according to claim 1 wherein the pre-drying in step (a) is conducted at a temperature between 90° C. and 150° C.

6. A method according to claim 1 wherein the heating in step (b) is conducted to a temperature between 800° C. and 1100° C.

7. A method according to claim 1 wherein the mixing in step (d) is conducted at a temperature between 200° and 700° C.

8. A method for drying alumina, the method comprising the steps of:

(a) subjecting a first portion of a wet alumina feed to pre-drying to product at least partially dried alumina and moisture;

(b) heating the at least partially dried alumina in a furnace, utilising excess combustion air, to a temperature higher than the temperature of the pre-drying to produce hot alumina, water vapour and products of combustion;

(c) passing the water vapour and products of combustion from step (b) to the pre-drying of step (a);

(d) mixing the hot alumina with a second portion of the wet alumina feed to cool the hot alumina; and (e) further cooling of the cooled alumina and subsequent separation to produce a low temperature alumina product.

9. A method according to claim 8, including the step of separating the at least partially dried alumina from the moisture and the products of combustion exiting the pre-drying of step (a).

10. A method according to claim 9 wherein the moisture and the products of combustion are passed through a wet scrubber following which the remaining gases are vented to atmosphere.

11. A method according to claim 8 wherein the step (b) utilises a minimum of excess combustion air.

12. A method according to claim 8 including the step of separating the hot alumina from the water vapour and products of combustion produced in step (b).

13. A method according to claim 8 including holding the cooled alumina from step (d) in a holding vessel for a pre-determined time at a pre-determined temperature.

14. A method according to claim 13 wherein overflow gases from the holding vessel are returned to the pre-drying of step (a).

15. A method according to claim 13 wherein the pre-determined time is in the range of from 10 to 30 minutes.

16. A method according to claim 13 wherein the pre-determined temperature is in the range of from 200° C. to 700° C.

17. A method according to claim 16 wherein the pre-determined temperature is 300° C.

18. A method according to claim 8 wherein the pre-drying of step (a) is conducted at a temperature between 90° C. and 150° C.

19. A method according to claim 8 wherein the heating of step (b) is conducted at a temperature between 800° C. and 1100° C.

20. A method according to claim 8 wherein the heating of step (b) is conducted in the presence of about 10% excess combustion air.

21. A method according to claim 8 wherein the mixing of step (d) is conducted at a temperature between 200° C. and 700° C.

22. A method for drying alumina, the method comprising the steps of:

(a) subjecting a first portion of the wet alumina feed to pre-drying at a temperature between 90° C. and 150° C. to produce at least partially dried alumina and moisture;

(b) separating the at least partially dried alumina from the moisture and products of combustion exiting the pre-drying step, venting the moisture and the products of combustion to atmosphere and transporting the at least partially dried alumina at a temperature between 90° C. and 150° C. to a furnace;

(c) heating the at least partially dried alumina to a temperature between 800° C. and 1100° C. in the furnace in the presence of about 10% excess combustion air to produce hot alumina, water vapour and products of combustion;

(d) separating the hot alumina from the water vapour and products of combustion;

(e) passing the water vapour and products of combustion from step (d) to the pre-drying of step (a);

(f) mixing the hot alumina with a second portion of the wet alumina feed to cool the hot alumina to a temperature between 200° and 700° C.;

(g) holding the cooled alumina in a holding vessel at a temperature between 200° C. and 700° C. for between 10 and 30 minutes; and (h) further cooling of the cooled alumina with air, and subsequent separation to produce a low temperature alumina product and heated air, the heated air being recycled to the furnace to provide combustion air for step (c); and (i) final cooling of the low temperature alumina product to a temperature suitable for downstream materials handling.

* * * * *